3,449,495
PROGESTATIONAL ACTIVE 17α-ALKOXY-16-
METHYLENE PROGESTERONES
Klaus Brückner, Darmstadt-Eberstadt, and Wolfgang Beerstecher, Hans-Gunther Kraft, and Hartmut Kieser, Darmstadt, Germany, assignors to E. Merck A.G., Darmstadt, Germany
No Drawing. Continuation-in-part of application Ser. No. 337,752, Jan. 15, 1964. This application Aug. 30, 1966, Ser. No. 575,956
Claims priority, application Germany, Jan. 19, 1963, M 55,494
Int. Cl. A61k 17/06; C07c 169/34
U.S. Cl. 424—243            9 Claims

ABSTRACT OF THE DISCLOSURE

17α-alkoxy-16-methylene-progesterones having a high ratio of anti-estrogenic to progestational activities, thereby being particularly suitable for administration as a contraceptive without breakthrough bleeding and associated trauma.

---

This is a continuation-in-part of copending United States patent application Ser. No. 337,752, filed Jan. 15, 1964 now abandoned.

The present invention relates to 17α-alkoxy steroids of the pregnane series.

An object of this invention, therefore, is to provide novel 17α-alkoxy steroids.

Another object is to provide processes for the preparation of these novel steroids.

It is yet a further object to provide novel pharmaceutical preparations as well as methods of effecting therapeutic activity, based on the novel steroids of this invention.

Upon further study of the specification and claims, other objects and advantages of the present invention will become apparent.

To attain the objects of this invention, there are provided 17α-alkoxy steroids of Formula I, as follows:

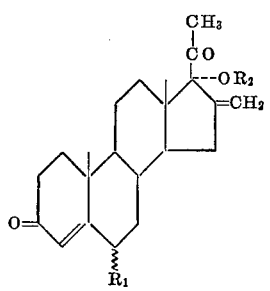

as well as the $\Delta^1$, $\Delta^6$, and $\Delta^{1,6}$ derivatives thereof wherein:

$R_1$ represents any of H, $CH_3$, F, or Cl; and
$R_2$ represents any of methyl, ethyl or propyl.

The particularly preferred species embraced by Formula I are:

17α-methoxy-16-methylene-progesterone
17α-methoxy-6α-methyl-16-methylene-progesterone
17α-ethoxy-16-methylene-progesterone
17α-ethoxy-6α-methyl-16-methylene-progesterone
17α-methoxy-16-methylene-1,4-pregnadiene-3,20-dione
17α-methoxy-6α-methyl-16-methylene-1,4-pregnadiene-3,20-dione
17α-methoxy-16-methylene-4,6-pregnadiene-3,20-dione
17α-methoxy-6-methyl-16-methylene-4,6-pregnadiene-3,20-dione
17α-methoxy-16-methylene-1,4,6-pregnatriene-3,20-dione
17α-methoxy-6-methyl-16-methylene-1,4,6-pregnatriene-3,20-dione
17α-propoxy-16-methylene-progesterone
17α-propoxy-6α-methyl-16-methylene-progesterone
6α-chloro-17α-methoxy-16-methylene-progesterone
6α-fluoro-17α-methoxy-16-methylene-progesterone
6-chloro-17α-methoxy-16-methylene-4,6-pregnadiene-3,20-dione
6α-chloro-17α-ethoxy-16-methylene-progesterone
6α-chloro-17α-propoxy-16-methylene-progesterone
17α-ethoxy-6α-fluoro-16-methylene-progesterone
6α-fluoro-17α-propoxy-16-methylene-progesterone
17α-ethoxy-16-methylene-1,4-pregnadiene-3,20-dione
17α-propoxy-16-methylene-1,4-pregnadiene-3,20-dione
17α-ethoxy-16-methylene-4,6-pregnadiene-3,20-dione
17α-propoxy-16-methylene-4,6-pregnadiene-3,20-dione
17α-ethoxy-16-methylene-1,4,6-pregnatriene-3,20-dione
17α-propoxy-16-methylene-1,4,6-pregnatriene-3,20-dione
6α-fluoro-17α-methoxy-16-methylene-1,4-pregnadiene-3,20-dione
6α-fluoro-17α-ethoxy-16-methylene-1,4-pregnadiene-3,20-dione
6α-fluoro-17α-propoxy-16-methylene-1,4-pregnadiene-3,20-dione
6-fluoro-17α-methoxy-16-methylene-4,6-pregnadiene-3,20-dione
6-fluoro-17α-ethoxy-16-methylene-4,6-pregnadiene-3,20-dione
6-fluoro-17α-propoxy-16-methylene-4,6-pregnadiene-3,20-dione
6-fluoro-17α-methoxy-16-methylene-1,4,6-pregnatriene-3,20-dione
6-fluoro-17α-ethoxy-16-methylene-1,4,6-pregnatriene-3,20-dione
6-fluoro-17α-propoxy-16-methylene-1,4,6-pregnatriene-3,20-dione
6α-chloro-17α-methoxy-16-methylene-1,4-pregnadiene-3,20-dione
6α-chloro-17α-ethoxy-16-methylene-1,4-pregnadiene-3,20-dione
6α-chloro-17α-propoxy-16-methylene-1,4-pregnadiene-3,20-dione
6-chloro-17α-ethoxy-16-methylene-4,6-pregnadiene-3,20-dione
6-chloro-17α-propoxy-16-methylene-4,6-pregnadiene-3,20-dione
6-chloro-17α-methoxy-16-methylene-1,4,6-pregnatriene-3,20-dione
6-chloro-17α-ethoxy-16-methylene-1,4,6-pregnatriene-3,20-dione
6-chloro-17α-propoxy-16-methylene-1,4,6-pregnatriene-3,20-dione
17α-ethoxy-6α-methyl-16-methylene-1,4-pregnadiene-3,20-dione
6α-methyl-16-methylene-17α-propoxy-1,4-pregnadiene-3,20-dione
17α-ethoxy-6-methyl-16-methylene-4,6-pregnadiene-3,20-dione
6-methyl-16-methylene-17α-propoxy-4,6-pregnadiene-3,20-dione
17α-ethoxy-6-methyl-16-methylene1,4,6-pregnatriene-3,20-dione
6-methyl-16-methylene-17α-propoxy-1,4,6-pregnatriene-3,20-dione The compounds according to the invention show a particularly valuable differentiation of the anti-estrogenic and progestational activities, compared to the corresponding compounds unsubstituted in the 16-position. Due to this differentiation, they are particularly suitable for prolonged or permanent administration as a contraceptive. Anti-estrogens possessing a strong progestational effect produce breakthrough bleedings when applied for the same purpose; the substances according to this invention exhibit these undesirable side effects only to a slight extent while the effect on the cervical mucus is maintained.

The fact that these compounds possess only an extremely weak anti-androgenic effect or no anti-androgenic effect at all is also favorable in this type of application: it would practically exclude the danger of a possible feminizing influence on the male fetus if the substances are applied during an unrecognized pregnancy.

For example, 6-methyl - 16 - methylene-17α-ethoxy-4,6-pregnadiene-3,20-dione exhibits a ratio of anti-estrogenic/progestational potency which is 3.5 times as high as that of 6-methyl-17α-ethoxy-4,6-pregnadiene-3,20-dione, and 9 times as high as that of 6-chloro-17α-acetoxy-4,6-pregnadiene-3,20-dione (chlormadinone acetate).

The new compounds of Formula I are especially effective in oral application.

The compounds of Formula I can be produced by etherifying a corresponding 17α-hydroxy steroid; or by liberating a keto group in the 3- and/or 20-position of a corresponding steroid containing one or two functionally modified keto groups; or by converting the 3β-hydroxy-5-ene or the 3-keto-5-ene group of a steroid which otherwise has the composition of Formula I by oxidation or by acidic or alkaline isomerization into the 3-keto-4-ene grouping, wherein the case of acidic isomerization the keto groups of the final product can occur in functionally altered form.

In this invention, in the 17α-alkoxy steroid thus obtained, a residue $R_1$ that is present in the 6β-position can be rearranged by the usual isomerization to the 6α-position. In addition to, or instead of this isomerization, one or two double bonds can be formed in the 6,7- and/or 1,2-positions by microbiological or chemical methods.

The various processes are now discussed in detail.

Compounds of Formula I can be obtained by etherifying a corresponding 17α-hydroxy steroid in the 17-position. Such a hydroxy steroid would be represented by Formula I wherein $R_1$ has the designated meaning, $R_2$ represents hydrogen, and where one or two additional double bonds can occur in the 6,7- and/or in the 1,2-positions. Suitable etherifying agents are, e.g., alkyl halides with 1–3 carbon atoms, preferably methyl iodide, methyl bromide, ethyl bromide, propyl iodide, or propyl bromide. An excess of the alkyl halide is used in the presence of freshly precipitated silver oxide at room temperature or at slightly higher temperatures with stirring. Suitable solvents for use during the etherification are preferably inert polar compounds, such as formamide, dimethyl formamide or dimethylsulfoxide. The reaction time is from 1 to 20 hours.

The new compounds can also be obtained by using as the starting substance a steroid which already carries all the substituents of the final product, but whose keto groups in the 3- and/or in the 20-position are in functionally altered forms. They can, e.g., be present as ketal, thioketal, enamine, enolacylate enol-ether, or as thio-enol-ether groups. It is best to start with enol-ethers which, instead of the keto groups in the 3- and/or 20-position carry groups 3β-OR-3-ene or 20β-OR-20-ene where R represents a lower alkyl group. Especially suitable as such starting materials are the 3- or 20-ethylene ketals or the 3,20-bis-ethylene ketals. Enamines suitable for use as starting materials are especially those which carry a lower aliphatic or cyclic amine as the amine residue. The functionally altered keto groups of these compounds can be liberated by treatment with acid reagents, such as inorganic acids or p-toluenesulfonic acid. The work is preferably done in the presence of an inert solvent, such as benzene, ethyl acetate, or methanol. The reaction can be performed at room temperature, but it is better to warm the mixture. The synthesis of steroids with functionally altered keto groups will then always be undertaken if the introduction of any of the other substituents into the molecule necessitates the prior blocking of the keto groups in the 3- or 20-position.

The new compounds of Formula I can also be produced from the 3β-hydroxy-5-ene steroids as starting materials by oxidation. As oxidizing agents use can be made of a solution of chromium trioxide in acetone in the presence of sulfuric acid. The oxidation can also be performed under the conditions of the Oppenauer dehydrogenation. For example, a solution of aluminum tertiary butylate or aluminum isopropylate in acetone or cyclohexanone can be used. The reaction is preferably performed by boiling under reflux. As a variant of this process, p-benzoquinone can be used as the keto component. Another double bond will be formed thereby in the molecule in the 6,7-position so that the 6-dehydro-derivative will be produced directly.

The oxidation of the 3β-hydroxy-5-ene steroid can also be produced microbiologically, e.g. by the use of microorganisms of the species *Flavobacterium dehydrogenans*. As a nutrient solution for *Flavobacterium dehydrogenans* use can be made, e.g. of a solution buffered to pH 6.8 of a 1% yeast extract in water. After allowing it to grow about 10 to 20 hours at about 28° C., the bacterial culture is added to the original steroid. Incubation in a current of air is continued 6 to 10 hours. The progress of the reaction can be controlled by measurement of the UV spectrum or by thin layer chromatographic observation.

The isomerization of the 5,6-double bond of a 3-keto 5-ene steroid which is used as the starting material and which otherwise already contains the desired substituents of the end product can be performed by the usual acidic or alkaline isomerization process. A suitable alkaline isomerizing agent is sodium bicarbonate whereas a suitable acidic agent is oxalic acid or p-toluene-sulfonic acid. In this reaction the work is preferably also done in the presence of a solvent such as methanol, ethanol or acetone. The reaction is preferably performed with warming. The mixture can be heated to the boiling point of the solvent. The reaction is generally completed after only a few minutes. If acid reagents are used for isomerization, the keto groups in the 3- and/or 20-position can be present in functionally altered form, e.g. as ketals. The acid reagents will not only bring about isomerization of the 5-double bond, but will also liberate the blocked keto groups.

An end product of Formula I which has in its 6-position a β-methyl group or a β-F or -Cl atom can be converted into the corresponding 6α-methyl, -F or -Cl compound by the usual isomerization methods. The following procedure is especially suitable. The 6β-substituted compound is dissolved in a suitable solvent such as methanol, chloroform or glacial acetic acid. Gaseous HCl is then passed into the reaction mixture at room temperature up to complete saturation. The mixture is then allowed to stand 10 to 20 hours at room temperature. The solution is then poured into cold water and extracted in the usual manner to obtain the 6α-substituted compound. The desired end product often crystallizes out directly so that it can be isolated by simple filtration.

With this invention it is also possible to dehydrogenate a compound of Furmula I in the 6,7- and/or 1,2-positions by known chemical or microbiological methods.

The formation of a 6,7-double bond is effectively accomplished by treatment with chloranil. The work is preferably done in the presence of an inert solvent such as benzene, toluene, xylene, chloroform, methylene chloride, acetone, methanol, ethanol, tertiary butanol, tertiary amyl alcohol, tetrahydrofuran, methyl or ethyl acetate, or glacial acetic acid. The reaction is preferably performed at a warm temperature, and possibly up to the boiling point of the solvent. The chloranil is used in 1:1 proportion, although an excess does no harm.

The formation of a 6,7-double bond in a 3-keto-4-ene steroid can also be effected by the use of manganese dioxide as a dehydrogenating agent. The work is preferably done in petroleum ether, chloroform, benzene, methylene chlorine or acetone. The reaction is performed at room temperature.

Instead of or in addition to a double bond in the 6,7-position, it is also possible to form a double bond in the 1,2-position by chemical or microbiological methods. Chemical agents suitable for 1,2-dehydrogenation are especially 2,3-dichloro-5,6-dicyano-p-benzoquinone or selenium dioxide. When working with 2,3-dichloro-5,6-dicyano-p-benzoquinone it is advantageous to use a solvent with a boiling point of 30–150° C. Suitable solvents are ethanol, butanol, tertiary butanol, methyl ester of tertiary butyl acetic acid, methyl acetate, ethyl acetate, dioxane, glacial acetic acid, benzene, tetrahydrofuran, acetone, etc. It is advantageous to add to the reaction mixture small amounts of nitro-benzene. The reaction times are 5 to 48 hours, depending on the solvents and on the starting materials. The reaction is preferably performed at the boiling point of the solvent.

When selenium dioxide is used as the dehydrogenating agent, suitable solvents are tertiary butanol, ethyl acetate or tertiary amyl alcohol. The reaction can be accelerated by the addition of small amounts of glacial acetic acid. A good yield can be obtained if the reaction mixture is boiled under reflux. The reaction is completed after 12 to 48 hours. The precipitated selenium is filtered off and the 1,2-dehydrogenation product separated from the filtrate.

For the microbiological 1,2-dehydrogenation use can be made of microorganisms of the following species: Alternaria, Didymella, Calonectria, Colletotrichum, Cylindrocarpon, Fusarium, Ophiobolus, Septomyxa, Vermicularia Acetobacter, Aerobacter, Alcaligenes, Bacillus, Corynebacterium, Erysipelothrix, Listeria, Micromonospora, Mycobacterium, Nocardia, Protaminobacter, Pseudomonas, Streptomyces.

The fermentation continues 4 to 15 hours, depending on the species that is used. Especially suitable are cultures of *Bacillus sphaericus* var. *fusiformis* and *Corynebacterium simplex*.

The 17α-alkoxy steroids with functionally altered keto groups in the 3- and/or 20-position which are used as starting substances for the process of this invention can, for example, by the functional alteration of one or more keto groups and subsequent 17α-etherization, be obtained from the corresponding 3,20-diketo - 17α - hydroxy - 16-methylene-steroids. The 3β-hydroxy-5-ene steroids which are used as the starting substances are obtained for example by etherization of 3β-acetoxy-5-ene-17α-hydroxy steroids and subsequent saponification in the 3-position. The 3-keto-5-ene steroids used as the starting substances in further examples of this invention can be produced from 3β-hydroxy-5-ene steroids by acidic oxidation. Those starting substances which are unsaturated in the 1,2- and/or 6,7-position can be produced from the corresponding compounds that are saturated in the 1,2- and/or 6,7-positions by the methods described above.

These new compounds, in admixture with the usual pharmaceutically acceptable carriers and especially in preparations for oral administration are of substantial therapeutic value. Suitable carrier substances are, e.g. vegetable oils, polyethylene glycol, gelatin, lactors, starch, magnesium stearate, talc, stearin, cholesterol, etc. The substances can be dispensed in the form of tablets, pills, dragees, emulsions or solutions. It is obviously also possible to add to them the usual excipients, such as preservatives, stabilizers, and wetting agents. The pharmaceutical composition in dosage unit form advantageously contains 0.1 to 100 mg. and preferably 1 to 10 mg. of the active compound. An effective dosage of the novel steroids of this invention can be administered by any conventional method, such as topical, peroral, and parenteral.

The progestational activity of the new steroids can be shown in the Clauberg assay on young female rabbits (see, for instance, McPhail, Journal of Physiology, volume 83, page 145 [1935]).

The anti-estrogenic activity can be determined by the method of Dorfman, Endocrinology, volume 68, page 17 (1961).

The anti-androgenic activity can be determined by administering the test compounds together with testosterone propionate to castrated male rats and determining the effect of the dosages given on the weight of seminal vesicles and prostate.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

10 g. 17α-methoxy-6α-methyl-16-methylene-5-pregnene-3,20-dione-bis-(ethylene-ketal), (prepared by ketalization and subsequent 17-methylation of 6α-methyl-16-methylene-17α-hydroxy-progesterone) are dissolved in 1.6 liter methanol, reacted with 23.4 ml. 5% sulfuric acid, and allowed to stand over night at room temperature. The mixture is then poured into water and extracted with ether. The ether solution which has been dried with sodium sulfate is evaporated to dryness. After chromatographic purification on silicon dioxide and recrystallization from ether, 4.3 g. pure 17α-methoxy-6α-methyl-16-methylene-progesterone are obtained. M.P. 178–179° C.; $(\alpha)_D^{20}$ +33.0° (chloroform);

$\lambda_{max.}$ ethanol 240 m$\mu$, $E_{1\,cm.}^{1\%}$ 481

In a similar manner there can be obtained: from 6α-fluoro-17α-methoxy-16-methylene-5-pregnene - 3,20 - dione-bis-(ethylene-ketal), the 6α - fluoro-17α-methoxy-16-methylene-progestrone; and from 6α-chloro-17α-methoxy-16 - methylene-5-pregnene-3,20-dione-bis-(ethylene-ketal), the 6α-chloro-17α-methoxy-16-methylene-progesterone.

Example 2

100 mg. 20-ethylene-dioxy-17α-methoxy-6α-methyl-16-methylene-1,4-pregnadiene-3-one are dissolved in 20 ml. methanol and then reacted with 0.23 ml. 5% sulfuric acid. From then on the procedure is the same as in Example 1. The yield is 48 mg. 17α-methoxy-6α-methyl-16-methylene-1,4-pregnadiene-3,20-dione. M.P. 187–189° C.; $(\alpha)_D^{20}$ −46° (chloroform);

$\lambda_{max.}$ 243.5 m$\mu$; $E_{1\,cm.}^{1\%}$ 415

In a similar manner there are obtainable:

From 20-ethylene-dioxy-17α-methoxy-16-methylene-1,4-pregnadiene-3-one, the 17α - methoxy-16-methylene-1,4-pregnadiene-3,20-dione;

From 20 - ethylene - dioxy-6α-fluoro-17α-methoxy-16-methylene-1,4-pregnadiene-3-one, the 6α-fluoro-17α-methoxy-16-methylene-1,4-pregnadiene-3,20-dione; and From 20 - ethylene - dioxy-6α-chloro-17α-methoxy-16-methylene-1,4-pregnadiene-3-one, the 6α-chloro-17α-methoxy-16-methylene-1,4-pregnadiene-3,20-dione.

Example 3

2.5 g. 17α-methoxy-6α-methyl-16-methylene-progesterone-20-ethylene-ketal are dissolved in 400 ml. methanol, and then reacted with 5.7 ml. 5% sulfuric acid. The mixture is allowed to stand over night at room temperature, is poured into water, and is extracted several times with ether. The ether extracts are dried with sodium sulfate and are concentrated under vacuum. After chromatographic purification and recrystallization from ether, 1.8 g. pure 17α-methoxy-6α-methyl-16-methylene-progesterone are obtained. M.P. 178–179° C.; $(\alpha)_D^{20}$ +33.0° (chloroform).

In an analogous manner there are obtainable: From 17α-ethoxy- (or 17α-propoxy-, respectively) -6α-methyl- 16-methylene-progesterone-20-ethylene-ketal, the 17α-ethoxy- (or 17α-propoxy-, respectively) -6α-methyl-16-methylene-progesterone.

Example 4

2 g. 17α-ethoxy-16-methylene-5-pregnene - 3,20 - dione are dissolved in 50 ml. methanol and reacted with a solution of 0.46 g. sodium bicarbonate in 6.8 ml. water. The mixture is boiled about 5 minutes under reflux, then cooled, and stirred into about 0.3 liter water acidified with 2 ml. glacial acetic acid. The precipitate is filtered with suction, washed with water, and recrystallized from ether. The yield is 1.2 g. pure 17α-ethoxy-16-methylene-progesterone. M.P. 137–138° C.; $(\alpha)_D^{20}$ +49.1° (chloroform);

$\lambda_{max.}$ 240.5 m$\mu$; $E_{1cm.}^{1\%}$ 468

Example 5

2.5 g. 17α-methoxy-16-methylene-5-pregnene-3β-ol-20-one are dissolved in 160 ml. benzene and 2.5 ml. cyclohexanone. From this mixture about 50 ml. are distilled off. Then are added 3.3 g. aluminum isopropylate dissolved in 16 ml. absolute benzene, and the mixture boiled 1 hour under reflux. After subsequent distillation with steam, the mixture is extracted by shaking with chloroform. The chloroform extract is dried over sodium sulfate and is evaporated to dryness under vacuum. After chromatographic purification and recrystallization from ether, the yield is 1.4 g. 17α-methoxy-16-methylene-progesterone. M.P. 189–191° C.; $(\alpha)_D^{20}$ +49.3° (chloroform);

$\lambda_{max.}$ 240.5 m$\mu$; $E_{1cm.}^{1\%}$ 490

Example 6

2 g. 17α-hydroxy-16-methylene-progesterone are dissolved in 40 ml. dimethyl formamide, reacted with 20 ml. methyl iodide and 4 g. freshly prepared silver oxide, and stirred about 15 hours at room temperature. The mixture is then treated with about 150 ml. chloroform and filtered. The residue is washed several times with chloroform and the combined chloroform filtrates evaporated to dryness under vacuum. After chromatographic purification with silica gel and recrystallization from ether the yield is 1.3 g. 17α-methoxy-16-methylene-progesterone. M.P. 189–191° C.; $(\alpha)_D^{20}$ +49.3° (chloroform);

$\lambda_{max.}$ 240.5 m$\mu$; $E_{1cm.}^{1\%}$ 490

Example 7

2 g. 17α-hydroxy-16-methylene-progesterone are dissolved in 10 ml. dimethylformamide, reacted with 20 ml. ethyl iodide and 4 g. freshly prepared silver oxide, and then treated as in Example 6. The yield is 0.7 g. 17α-ethoxy-16-methylene-progesterone. M.P. 137–138° C.; $(\alpha)_D^{20}$ +49.1° (chloroform);

$\lambda_{max.}$ 240.5 m$\mu$; $E_{1cm.}^{1\%}$ 468

Example 8

100 mg. 17α-methoxy-6β-methyl-16-methylene-progesterone are reacted with an amount of chloroform that is required for complete solution and is saturated with HCl gas while being cooled from without. After standing over night at room temperature, the solution is stirred into ice water and the precipitate worked up to obtain 55 mg. 17α-methoxy-6α-methyl-16-methylene-progesterone. M.P. 178–179° C.; $(\alpha)_D^{20}$ +33° (chloroform);

$\lambda_{max.}$ 240 m$\mu$; $E_{1cm.}^{1\%}$ 481

Example 9

100 mg. 17α-ethoxy-6β-methyl-16-methylene-progesterone are reacted at room temperature with 100 mg. KOH and sufficient aqueous 90% methanol for complete solution. The mixture is allowed to stand about 5 hours in an atmosphere of nitrogen and is then poured into ice water. The precipitate is then worked up in the usual manner to produce 49 mg. 17α-ethoxy-6α-methyl-16-methylene-progesterone. M.P. 122–123° C.; $(\alpha)_D^{20}$+34.4° (chloroform);

$\lambda_{max.}$ 240.5 m$\mu$; $E_{1cm.}^{1\%}$ 432

Example 10

1 g. 17α-hydroxy-6α-methyl-16-methylene-progesterone are dissolved in 20 ml. dimethylformamide, reacted with 10 ml. ethyl iodide and 2 g. freshly prepared silver oxide, and stirred about 17 hours at room temperature. The material is worked up as in Example 6, producing 0.46 g. 17α-ethoxy-6α-methyl-16-methylene-progesterone. M.P. 122–123° C.; $(\alpha)_D^{20}$+34.4° (chloroform);

$\lambda_{max.}$ 240.5 m$\mu$; $E_{1cm.}^{1\%}$ 432

Example 11

2 g. 17α-hydroxy-16-methylene-progesterone are dissolved in 40 ml. formamide, reacted with 20 ml. propyl iodide and 4 g. freshly prepared silver oxide, and worked up as in Example 6. The yield is 0.12 g. 17α-propoxy-16-methylene-progesterone. $\lambda_{max.}$ 240.5 m$\mu$.

In a similar manner, from 17α-hydroxy-6α-methyl-16-methylene-progesterone is obtained the 17α-propoxy-6α-methyl-16-methylene-progesterone.

Example 12

1.5 g. 17α-methoxy-6α-methyl-16-methylene-progesterone are dissolved in 50 ml. tertiary butanol, reacted with 0.9 g. chloranil, and heated to boiling 8 hours under reflux. Most of the tertiary butanol is then distilled off under reduced pressure and the residue taken up with chloroform. The material is then washed successively with soda solution, with dilute sulfuric acid, and with sodium bicarbonate solution. It is then dried, concentrated, and the residue recrystallized from acetone/ether. The yield is 1.2 g. 17α-methoxy-6-methyl-16-methylene-4,6-pregnadiene-3,20-dione. M.P. 181–182° C.; $(\alpha)_D^{20}$—16° (chloroform);

$\lambda_{max.}$ 288 m$\mu$; $E_{1cm.}^{1\%}$ 675

In a similar manner there are obtained from corresponding derivatives that are saturated in their 6, 7 position:

17α-methoxy-16-methylene-4,6-pregnadiene-3,20-dione;
6-fluoro-17α-methoxy-16-methylene-4,6-pregnadiene-3,20-dione;
6-chloro-17α-methoxy-16-methylene-4,6-pregnadiene-3,20-dione;
17α-methoxy-16-methylene-1,4,6-pregnatriene-3,20-dione.

Example 13

5 liter of a nutrient solution of 0.1% yeast extract (pH 6.8) is inoculated with 500 ml. of an agitated culture of Corynebacterium simplex. With agitation and intense aeration (temperature 28° C.) the culture is allowed to grow, and after 10 hours has added to it 2 g. 17α-methoxy-6α-methyl-16-methylene-progesterone dissolved in 80 ml. methanol. The 1,2-dehydrogenation is followed by chromatography and is usually completed after 10–15 hours. The fermented solution is extracted several times with chloroform and the combined extracts are evaporated down and purified over a column of silica gel. After recrystallization from acetone/ether, the yield is 1.1 g. 17α-methoxy-6α-methyl-16-methylene - 1,4 - pregnadiene-3,20-dione. M.P. 187–189° C.; $(\alpha)_D^{20}$—46° (chloroform);

$\lambda_{max.}$ 243.5 m$\mu$; $E_{1cm.}^{1\%}$ 415

In a similar manner there are obtained from corresponding derivatives that are saturated in the 1,2-position:

17α-methoxy-16-methylene-1,4-pregnadiene-3,20-dione
17α-ethoxy-16-methylene-1,4-pregnadiene-3,20-dione
17α-ethoxy-6α-methyl-16-methylene-1,4-pregnadiene-3,20-dione (M.P. 151–152° C.)
17α-methoxy-16-methylene-1,4,6-pregnatriene-3,20-dione 17α-ethoxy-16-methylene-1,4,6-pregnatriene-3,20-dione
17α-methoxy-6-methyl-16-methylene-1,4,6-pregnatriene-3,20-dione
6-fluoro-17α-methoxy-16-methylene-1,4,6-pregnatriene-3,20-dione
6-chloro-17α-methoxy-16-methylene-1,4,6-pregnatriene-3,20-dione Example 14

5 g. 17α-hydroxy-6α-methyl-16-methylene-1,4-pregnadiene-3,20-dione are dissolved in 100 ml. dimethylsulfoxide, reacted with 50 ml. methyl iodide and 10 g. freshly precipitated silver oxide, and are then worked up as in Example 6. The yield is 3.3 g. 17α-methoxy-6α-methyl-16-methylene-1,4-pregnadiene-3,20-dione. M.P. 187–189° C.; $(\alpha)_D^{20}$—46° (chloroform);

$\lambda_{max.}$ 243.5 m$\mu$; $E_{1\,cm.}^{1\%}$ 415

Example 15

100 mg 17α-hydroxy-6-methyl-16-methylene-1,4,6-pregnatriene-3,20-dione are dissolved in 5 ml. dimethyl formamide, reacted with 0.2 ml. methyl iodide and 200 mg. freshly prepared silver oxide, and then worked up as in Example 6. The yield is 41 mg. 17α-methoxy-6-methyl-16-methylene-1,4,6-pregnatriene-3,20-dione. M.P. 188–189° C.; $(\alpha)_D^{20}$—97.3° (chloroform).

Example 16

5 g. 17α-hydroxy-6-methyl-16-methylene-4,6-pregnadiene-3,20-dione are dissolved in 100 ml. dimethyl-formamide, reacted with 50 ml. methyl iodide and 10 g. freshly prepared silver oxide, and then worked up as in Example 6. The yield is 3.2 g. 17α-methoxy-6-methyl-16-methylene-4,6-pregnadiene-3,20-dione. M.P. 181–182° C.; $(\alpha)_D^{20}$—16° (chloroform);

$\lambda_{max.}$ 288 m$\mu$; $E_{1\,cm.}^{1\%}$ 675

Example 17

100 mg. 6-chloro-17α-hydroxy-16-methylene-4,6-pregnadiene-3,20-dione are dissolved in 5 ml. dimethyl sulfoxide, reacted with 0.2 ml. methyl iodide and 200 mg. freshly prepared silver oxide, and then worked up as in Example 6. The yield is 4.6 mg. 6-chloro-17α-methoxy-16-methylene-4,6-pregnadiene-3,20-dione.

$\lambda_{max}$ 283 m$\mu$; $E_{1\,cm.}^{1\%}$ 577

Analogously, with ethyl iodide, there is obtained the 6-chloro-17α-ethoxy-16-methylene-4,6-pregnadiene-3,20-dione.

The following are examples for pharmaceutical compositions of the new compounds:

(A) Tablets:

|  | Mg. |
|---|---|
| 17α-methoxy-16-methylene-progesterone | 6 |
| Lactose | 70 |
| Corn starch | 22 |
| Magnesium stearate | 2 |

(B) Tablets:

|  | Mg. |
|---|---|
| 17α-methoxy-6α-methyl-16-methylene-1,4-pregnadiene-3,20-dione | 4 |
| Lactose | 76 |
| Potato starch | 20 |

(C) Coated tablets:

|  | Mg. |
|---|---|
| 6-chloro-17α-ethoxy-16-methylene-4,6-pregnadiene-3,20-dione | 2 |
| Lactose | 80 |
| Corn starch | 15 |
| Talc | 2 |
| Magnesium stearate | 1 |

The coating is a mixture of corn starch, sugar, talc, and tragacanth.

(D) Ampoules:
Each ampoule contains:

|  |  |
|---|---|
| 6-chloro-17α-methoxy-16-methylene-progesterone mg | 10 |
| Sesame oil ml | 1 |

(E) Tablets:

|  | Mg. |
|---|---|
| 6-chloro-17α-ethoxy-16-methylene-progesterone | 4 |
| 17α-ethynyl estradiol | 0.04 |
| Lactose | 85 |
| Potato starch | 10 |
| Talc | 2 |

Example 18

Analogously to Example 12, 17α-ethoxy-6α-methyl-16-methylene-progesterone (prepared from 17α-hydroxy-6α-methyl-16-methylene-progesterone and ethyl iodide) is reacted with chloranil to furnish 17α-ethoxy-6-methyl-16-methylene-4,6-pregnadiene-3,20-dione. M.P. 131–132° C.; $(\alpha)_D^{20}$—17.4° (chloroform).

Example 19

1.75 g. 17α-ethoxy-6α-methyl-16-methylene-progesterone and 1.8 g. 2,3-dichloro-5,6-dicyano-benzoquinone are refluxed in 50 ml. dioxane for 8 hours. The mixture is cooled, the hydroquinone formed is filtered off, the filtrate is concentrated to a small volume diluted with chloroform and successively washed with water, dilute sodium hydroxide solution and again with water. The chloroform phase is dried with sodium sulfate and concentrated. On addition of ether, there is obtained the 17α-ethoxy-6α-methyl-16-methylene-1,4-pregnadiene-3,20-dione. M.P. 151–152° C.; $(\alpha)_D^{20}$—38° (dioxane).

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A steroid of the group consisting of a compound of the formula:

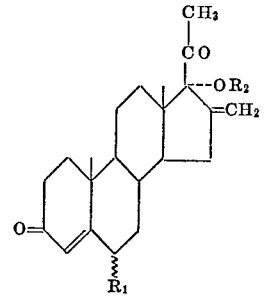

and $\Delta^1$, $\Delta^6$; and $\Delta^{1,6}$ derivatives thereof, wherein
   $R_1$ is selected from the group consisting of hydrogen, methyl, fluorine, and chlorine; and
   $R_2$ is selected from the group consisting of methyl, ethyl, and propyl.

2. 17α-methoxy-6-methyl-16-methylene-4,6-pregnadiene-3,20-dione, a species of claim 1.

3. 17α-ethoxy-6-methyl-16-methylene-4,6-pregnadiene-3,20-dione, a species of claim 1.

4. A pharmaceutical composition in unit dosage form for effecting contraceptive activity without breakthrough bleeding in a female mammal, a pharmaceutically acceptable carrier and 0.1–100 mg. of a steroid as defined by claim 1.

5. A pharmaceutical composition in unit dosage form for effecting contraceptive activity without breakthrough bleeding in a female mammal, a pharmaceutically acceptable carrier and 0.1–100 mg. of a steroid as defined by claim 2.

6. A pharmaceutical composition in unit dosage form for effecting contraceptive activity without breakthrough bleeding in a female mammal, a pharmaceutically acceptable carrier and 0.1–100 mg. of a steroid as defined by claim 3.

7. A process for effecting contraceptive activity in female mammals without breakthrough bleedings associated with a strong progestational effect, which process comprises orally administering to said mammals a dosage of a steroid as defined by claim 1, said steroid exhibiting a high ratio of anti-estrogenic/progestational activity, and said dosage being sufficient to impart a contraceptive activity.

8. A process for effecting contraceptive activity in female mammals without breakthrough bleedings associated with a strong progestational effect, which process comprises orally administering to said mammals a dosage of a steroid as defined by claim 2, said steroid exhibiting a high ratio of anti-estrogenic/progestational activity, and said dosage being sufficient to impart a contraceptive activity.

9. A process for effecting contraceptive activity in female mammals without breakthrough bleedings associated with a strong progestational effect, which process comprises orally administering to said mammals a dosage of a steroid as defined by claim 3, said steroid exhibiting a high ratio of anti-estrogenic/progestational activity, and said dosage being sufficient to impart a contraceptive activity.

References Cited

UNITED STATES PATENTS

| | | | |
|---|---|---|---|
| 3,105,840 | 10/1963 | Beyler | 260—397.4 |
| 3,280,114 | 10/1966 | Kincl | 260—239.55 |
| 3,312,692 | 4/1967 | Oliveto et al. | 260—239.5 |

ELBERT L. ROBERTS, *Primary Examiner.*

U.S. Cl. X.R.

260—397.4